UNITED STATES PATENT OFFICE.

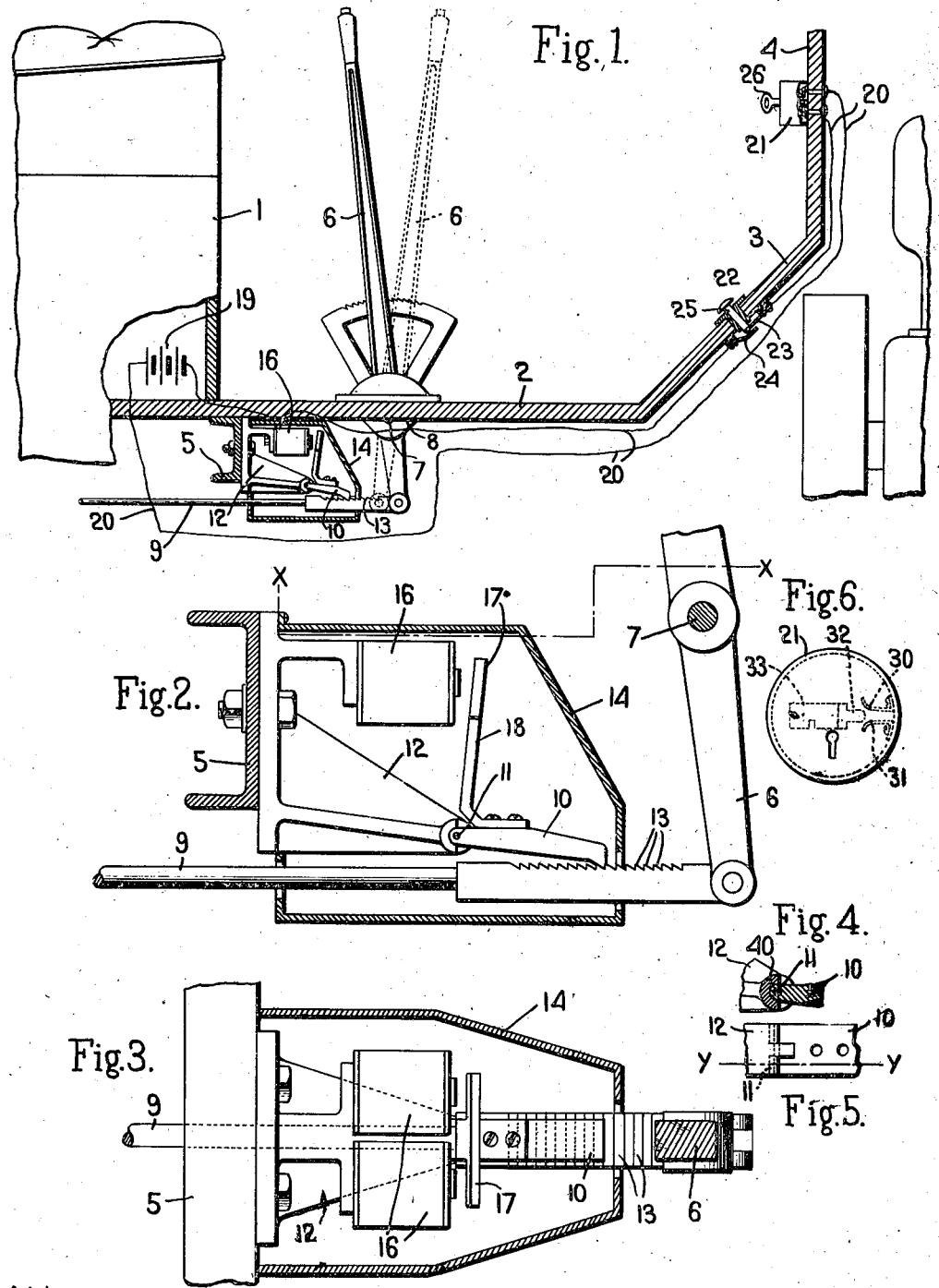

GEORGE A. THEOBALD, OF BOSTON, MASSACHUSETTS.

AUTOMOBILE-LOCK.

1,201,390.  Specification of Letters Patent.  Patented Oct. 17, 1916.

Application filed January 10, 1914. Serial No. 811,320.

*To all whom it may concern:*

Be it known that I, GEORGE A. THEOBALD, a citizen of the United States, residing at Boston, county of Suffolk, State of Massachusetts, have invented an Improvement in Automobile-Locks, of which the following description, in connection with the accompanying drawing, is a specification, like characters on the drawing representing like parts.

This invention relates to automobile locks which are intended to prevent an automobile from being stolen or tampered with by unauthorized persons.

My improved lock is associated with the emergency brake and has such a construction that when the emergency brake is set, as it usually is when the car is left standing, said brake becomes automatically locked and can only be unlocked by properly-authorized persons.

In the preferred embodiment of my invention the lock for the emergency brake is of that character which can be released only by the action of a magnet, and my invention comprehends controlling means for the magnet which prevent the magnet from being energized to release the lock except by properly-authorized persons.

Referring now to the drawings wherein I have illustrated a preferred embodiment of my invention which is sufficient to disclose the principle thereof, Figure 1 is a fragmentary sectional view of an automobile showing one arrangement embodying my invention; Fig. 2 is an enlarged view partly in section of the lock for the emergency brake rod; Fig. 3 is a section on the line *x—x*, Fig. 2; Fig. 4 is a section on the line *y—y*, Fig. 5; Fig. 5 is a detail of the hinge connection for the locking pawl; Fig. 6 shows a lock switch which may be used for the controlling circuit.

I have shown at 1 a portion of an automobile body having the usual floor 2, footboard 3, dash-board 4, and cross sill 5 forming part of the chassis and on which the floor is supported. These parts may have any usual or suitable construction. 6 designates the emergency brake lever pivoted at 7 to the support 8 which is secured to the floor, the lower end of the lever being connected to the emergency brake rod 9 as usual in devices of this class. In accordance with my invention I provide an automatically-acting lock for the emergency brake rod 9 which lock becomes operative automatically when the brake is set to lock the brake rod from movement in a direction to release the brake, and I also provide means by which this lock can be released only by properly-authorized persons. The lock I have herein shown is in the form of a locking pawl 10 pivotally mounted at 11 to a bracket 12 that is secured to the cross girder 5, said locking pawl coöperating with the ratchet teeth 13 which are formed in the brake rod 9. The locking pawl 10 is automatic in its action, which result may be secured either by making it a gravity-actuated pawl or having it controlled by a spring. In the present embodiment it is in the form of a gravity-actuated pawl which clicks over and automatically locks into the notches 13 as the brake is set. This locking pawl is inclosed within a housing or casing 14 which is secured to the bracket 12 in any suitable way and which prevents unauthorized persons from releasing it.

While any suitable means capable of being operated only by authorized persons can be used for releasing the pawl 10, I have herein shown for this purpose electrical means in the form of a magnet 16 which is secured to the bracket and the armature 17 of which is mounted on an arm 18 connected to the locking pawl 10 so that when the magnet is energized the pawl will be raised from the notches 13. This magnet can be energized from any suitable source of electric supply. I prefer, however, to connect the magnet to a battery 19 which may be the battery which supplies current to the sparking plug or may be a separate battery as desired. The circuit from the battery which includes the magnet 16 is shown diagrammatically at 20 and is a normally open circuit, but can be closed whenever desired by means of a push-button device 22 which will preferably be located in the floor of the car at some point where it can be conveniently operated by the foot of the chauffeur. The circuit 20 also will preferably include a switch device 21 by which the circuit can be locked open. The push-button device may be of any suitable construction adapted to close the circuit. As herein shown it comprises two contacts 23 and 24 connected to one side of the circuit but normally separated from each other and a plunger 25 operating through the floor of the car by which the contacts 23, 24 can be closed. As soon as the pressure is removed from the plunger 25, the resiliency of the contact 23 will serve to open the contacts and thus open the circuit.

Any suitable key operated switch device 21 can be used by which the circuit 20 can be locked either opened or closed at this point. I have shown in Fig. 6 a simple form of construction which comprises two terminals 30 and 31 connected to the two sides of the circuit 20 and a contact member 32 adapted to bridge the terminals and close the circuit 20. This contact member is carried by a sliding bolt 33 which can be operated by a key 26. This construction affords means by which the circuit 20 can be locked either opened or closed at the switch 21 by means of the key 26.

The operation of the device will be readily apparent from the foregoing. Whenever the emergency brake is set, it becomes automatically locked and can only be released by energizing the magnet 16 inasmuch as the lock is inclosed by the casing 14 and cannot be tampered with. If the switch 21 is closed, then the magnet 16 may be energized by simply operating the push-button device 22. When a party intends to leave his automobile standing unguarded he will first set the emergency brake thereby automatically locking it, and will then operate the switch 21 so as to lock the circuit 20 open at this point and then take the key with him. When the device is in this condition the circuit 20 cannot be closed simply by operating the push-button device 22, but only by first operating the lock switch 21, and as this cannot be accomplished except by the person who has the proper key the automobile will be safely locked.

Inasmuch as the strain against the locking pawl 10 is in the direction of its length, I prefer to employ the construction for the pivot thereof shown in Figs. 2 and 4. The bracket 12 is shown as having a curved seat 40 against which the rounded end of the pawl 10 rests, said pawl being held in its position by the pivotal pin 11. The construction is such that the strain on the pawl does not come on the pivotal pin 11, however, but directly on the seat 40.

My invention can readily be applied to any automobile at a very small expense and it affords means whereby the automobile can be securely locked against theft or being tampered with by unauthorized persons.

Having fully described my invention, what I claim as new and desire to secure by Letters Patent is:—

1. The combination with a bar or rod to be locked, said bar or rod having ratchet teeth thereon, of a closed casing through which passes the portion of said bar or rod having the ratchet teeth thereon, a bracket within said casing, a gravity-actuated pawl pivoted to said bracket and engaging said teeth thereby automatically locking the bar from movement in one direction, a magnet also carried by said bracket, said pawl having an arm extending therefrom carrying the armature for said magnet, a circuit for the magnet, and means for closing the circuit thereby to energize the magnet and disengage the pawl from and unlock the bar.

2. In a device of the class described, the combination with a rod or bar to be locked, said rod or bar having ratchet teeth thereon, of a closed casing through which the ratchet-toothed portion of said bar passes, a bracket within said casing, a thrust pawl pivotally mounted on said bracket and adapted when engaging the ratchet teeth to prevent any movement of the rod toward the bracket, a magnet secured to said bracket within the casing, an arm extending from said pawl and provided with an armature for the magnet, a circuit for the magnet, and means to close the circuit thereby to withdraw the pawl from and unlock the bar.

In testimony whereof, I have signed my name to this specification, in the presence of two subscribing witnesses.

GEORGE A. THEOBALD.

Witnesses:
 LOUIS C. SMITH,
 BERTHA F. HEUSER.